United States Patent

Alex et al.

[11] Patent Number: 6,018,015
[45] Date of Patent: *Jan. 25, 2000

[54] ANTISTATIC BELTS

[75] Inventors: Patrick Alex, Limours Pecqueuse, France; Jun Yamamoto, Tokyo, Japan

[73] Assignee: Elf Atochem S.A., Puteaux, France

[*] Notice: This patent is subject to a terminal disclaimer.

[21] Appl. No.: 09/184,726

[22] Filed: Nov. 2, 1998

Related U.S. Application Data

[63] Continuation of application No. 08/775,680, Dec. 23, 1996, Pat. No. 5,830,983.

[30] Foreign Application Priority Data

Dec. 21, 1995 [FR] France .................................. 95 15245

[51] Int. Cl.⁷ .............................. C08G 73/00; F16G 1/00; F16G 5/00
[52] U.S. Cl. ........................ 528/332; 528/170; 528/310; 528/322; 525/422; 525/427; 524/571; 524/600; 524/606; 474/237; 474/265; 474/202; 428/411.1; 428/423.1; 428/444.4; 428/462; 428/500; 428/521
[58] Field of Search ...................................... 528/170, 322, 528/310, 332; 524/600, 606, 571; 428/411.1, 423.1, 462, 444.4, 500, 521; 474/237, 265, 202; 525/422, 427

[56] References Cited

U.S. PATENT DOCUMENTS

| | | | |
|---|---|---|---|
| 4,643,938 | 2/1987 | Oyama et al. | 428/268 |
| 5,112,282 | 5/1992 | Patterson | 474/260 |
| 5,830,983 | 11/1998 | Alex et al. | 528/322 |

FOREIGN PATENT DOCUMENTS

| | | |
|---|---|---|
| 61-136036 | 6/1986 | Japan . |
| 63-063748 | 3/1988 | Japan . |
| 3277850 | 12/1991 | Japan . |
| 5044784 | 2/1993 | Japan . |

*Primary Examiner*—P. Hampton-Hightower

[57] ABSTRACT

The invention relates to belts made of thermoplastic polymer (A) and comprising a sufficient amount of a polymer (B) to render them antistatic, the said polymer (B) comprising polyethylene glycol blocks. Use is advantageously made of polymers (A) containing polyamide-6 (PA-6) or polyamide-12 (PA-12) blocks and polytetramethylene glycol blocks and polymers (B) containing PA-6 or PA-12 blocks and polyethylene glycol blocks.

16 Claims, No Drawings

ANTISTATIC BELTS

This is a continuation of application Ser. No. 08/775,680, filed Dec. 23, 1996 now U.S. Pat. No. 5,830,983.

BACKGROUND OF THE INVENTION

1. Technical Field

The present invention relates to antistatic belts. In particular, it relates to power transmission belts and conveyor belts.

2. Description of Related Art

The friction of power transmission belts and conveyer belts on the pulleys, the drive rollers or the rollers to be driven causes static electricity which can damage electronic mechanisms or articles transported by the belt. The majority of belts made of rubber or of thermoplastic polymer can be rendered antistatic by the incorporation of carbon black, of conductive plasticizers and of additives such as quaternary ammonium salts or ethoxylated derivatives.

These incorporated products migrate in the polymer or the rubber and exude, which weakens or destroys the antistatic effect. As for carbon black, in particular, its color is sometimes unacceptable. It is also possible to incorporate conductive fibers in the belt, which is optionally in woven form, but it is necessary to use adhesives. Moreover, the mechanical properties are sometimes very different from the material of the belt, which can result in breakages or losses in antistatic behavior.

SUMMARY OF THE INVENTION

It has now been discovered that it is possible to make belts from thermoplastic polymer (A) comprising a polymer (B) comprising polyethylene glycol blocks in an amount sufficient to render the belts antistatic.

Within the meaning of the invention, the term "belts" is understood to imply both power transmission belts, which can be flat, or "v"-shaped, trapezoidal or even circular in cross-section, and conveyor belts. The said conveyor belts can be, for example, from 0.2 to 1.5 m wide, for the transportation of articles, and bands from 1 to 5 cm wide for reading magnetic tickets or cards.

The thermoplastic polymer (A) is any polymer having mechanical characteristics which are satisfactory for making a belt, that is to say, having size stability at small elongations while having good stress at these small elongations. Moreover, the thermoplastic polymer must be insensitive to moisture, in order for its mechanical properties to be independent of ambient moisture. Suitable examples of polymer (A), includes:

styrene/butadiene/styrene (SBS) block copolymers;

styrene/ethylene-butene/styrene (SEBS) block copolymers;

styrene/isoprene/styrene (SIS) copolymers;

EPDMs (ethylene-propylene-diene);

ethylene-propylene rubbers (EPR);

polyamides or mixtures of polyamides and polyolefins with a polyamide matrix;

polyurethane elastomers (TPU);

polyetherester elastomers;

polymers containing polyamide blocks and polyether blocks.

The term "polyamide" is understood to mean the condensation products:

of one or a number of amino acids, such as aminocaproic, 7-aminoheptanoic, 11-aminoundecanoic and 12-aminododecanoic acids, or of one or a number of lactams, such as caprolactam, oenantholactam and lauryllactam;

of one or a number of salts or mixtures of diamines, such as hexamethylenediamine, dodecamethylenediamine, meta-xylylenediamine, bis-(p-aminocyclohexyl)methane and trimethylhexamethylene-diamine, with diacids, such as isophthalic, terephthalic, adipic, azelaic, suberic, sebacic and dodecanedicarboxylic acids;

or mixtures of some of these monomers, which results in copolyamides.

Polyamide mixtures can be used. Use is advantageously made of nylon-6 (PA-6), nylon-6,6 (PA-6,6) and nylon-12 (PA-12).

As regards mixtures of polyamide and polyolefins with a polyamide matrix, the term "polyolefins" is understood to mean polymers comprising olefin units such as, for example, ethylene, propylene or 1-butene units, and the like.

Mention may be made, by way of example, of:

polyethylene, polypropylene or copolymers of ethylene with α-olefins, it being possible for these products to be grafted with unsaturated carboxylic acid anhydrides, such as maleic anhydride, or unsaturated epoxides, such as glycidyl methacrylate, copolymers of ethylene with at least one product chosen from (i) unsaturated carboxylic acids, their salts or their esters, (ii) vinyl esters of saturated carboxylic acids, (iii) unsaturated dicarboxylic acids, their salts, their esters, their monoesters or their anhydrides, or (iv) unsaturated epoxides, it being possible for these ethylene copolymers to be grafted with unsaturated dicarboxylic acid anhydrides or saturated epoxides, styrene/ethylene-butene/styrene (SEBS) block copolymers which are optionally maleized.

Mixtures of two or a number of these polyolefins can be used.

Use is advantageously made of:

polyethylene, copolymers of ethylene and an α-olefin, ethylene/alkyl (meth)acrylate copolymers, ethylene/alkyl (meth)acrylate/maleic anhydride copolymers, the maleic anhydride being grafted or copolymerized, ethylene/alkyl (meth)acrylate/glycidyl methacrylate copolymers, the glycidyl methacrylate being grafted or copolymerized, and polypropylene.

It is advantageous, in order to facilitate the formation of the polyamide matrix, if the polyolefins have few or no functional groups which can facilitate compatibilization, to add a compatibilizing agent.

The compatibilizing agent is a product known per se for compatibilizing polyamides and polyolefins.

Mention may be made, for example, of:

polyethylene, polypropylene, ethylene-propylene copolymers or ethylene-butene copolymers, all these products being grafted with maleic anhydride or glycidyl methacrylate, ethylene/alkyl (meth)acrylate/maleic anhydride copolymers, the maleic anhydride being grafted or copolymerized, ethylene/vinyl acetate/maleic anhydride copolymers, the maleic anhydride being grafted or copolymerized, the two preceding copolymers in which maleic anhydride is replaced by glycidyl methacrylate, ethylene/(meth)acrylic acid copolymers or optionally their salts, polyethylene, propylene or ethylene-propylene copolymers, these polymers being grafted with a product exhibiting a site which reacts with amines, these grafted copolymers then being condensed with polyamides or polyamide oligomers having a single amine end group.

These products are described in Patents FR 2,291,225 and EP 342,066, the contents of which are incorporated herein by reference.

The amount of polyamide forming the matrix can be between 55 and 95 parts by weight per 5 to 45 parts by weight of polyolefins.

The compatibilizing agent is used in an amount sufficient for the polyolefin to disperse in the form of nodules in the polyamide matrix. It can represent up to 20% of the weight of the polyolefin. These products are manufactured by mixing polyamide, polyolefin and, optionally, compatibilizing agent according to the usual techniques for mixing in the molten state (twin-screw, Buss, single-screw).

The polyurethane elastomers result from the sequence containing the following three (3) base units:

1) a linear polyol with OH endings with a molar mass, for example, of 500 to 3,500. The polyols can be chosen either from polyesters, such as adipates, azelates, isophthalates and polycaprolactone, or from polyethers, such as polypropylene glycol (PPG) or polytetramethylene glycol (PTMG), 2) a diisocyanate which can be aromatic, such as diphenylmethane 4,4'-diisocyanate (MDI) or toluene 2,4-diisocyanate (TDI) or nonaromatic, such as dicyclohexylmethane 4,4'-diisocyanate, 3) a low molecular weight glycol, such as 1,4-butanediol, ethylene glycol or 1,4-phenylene bis(β-hydroxyethyl) ether, as chain extender.

The sequences containing (1) and (2) form the flexible segments of the polyurethane and the sequences containing (1) and (3) form the rigid segments.

The polyetheresters comprise the following units:

1) dicarboxylic acids, such as terephthalic acid or 2,6-naphthalenedicarboxylic acid;

2) polyetherdiols, such as polypropylene glycol or polytetramethylene glycol;

3) a low molecular weight glycol, such as 1,4-butanediol or ethylene glycol.

The sequences containing (1) and (2) form the flexible segments of the polyetherester and the sequences containing (1) and (3) form the rigid segments thereof.

These products are described in Patents EP 402,883 and EP 405,227.

The polymers containing polyamide blocks and polyether blocks result from the copolycondensation of polyamide sequences containing reactive ends with polyether sequences containing reactive ends, such as, inter alia:

1) Polyamide sequences containing diamine chain ends with polyoxyalkylene sequences containing dicarboxyl chain ends, 2) Polyamide sequences containing dicarboxyl chain ends with polyoxyalkylene sequences containing diamine chain ends obtained by cyanoethylation and hydrogenation of α,ω-dihydroxylated aliphatic polyoxyalkylene sequences, known as polyetherdiols, 3) Polyamide sequences containing dicarboxyl chain ends with polyetherdiols, the products obtained being, in this specific case, polyetheresteramides.

The polyamide sequences containing dicarboxyl chain ends result, for example, from the condensation of α,ω-aminocarboxylic acids from lactams or from dicarboxylic acids and diamines in the presence of a chain-limiting dicarboxylic acid. The polyamide blocks are advantageously formed from polyamide-12 or from polyamide-6.

The number-average molar mass $\overline{Mn}$ of the polyamide sequences is between 300 and 15,000 and preferably between 600 and 5,000. The $\overline{Mn}$ mass of the polyether sequences is between 100 and 6,000 and preferably between 200 and 3,000.

The polymers containing polyamide blocks and polyether blocks can also comprise units distributed randomly. These polymers can be prepared by the simultaneous reaction of the polyether and the precursors of the polyamide blocks.

For example, polyetherdiol, a lactam (or an α,ω-amino acid) and a chain-limiting diacid can be reacted in the presence of a small amount of water. A polymer is obtained having essentially polyether blocks and polyamide blocks of highly variable length but also the various reactants, which have reacted randomly, distributed statistically along the polymer chain.

These polymers contain polyamide blocks and polyether blocks, whether they originate from the copolycondensation of polyamide and polyether sequences prepared beforehand or from a single-stage reaction, exhibit, for example, Shore D hardnesses which can be between 30 and 75 and advantageously between 30 and 70 and an intrinsic viscosity between 0.8 and 2.5, measured in metacresol at 250° C. for an initial concentration of 0.8 g/100 ml.

Whether the polyether blocks derive from polypropylene glycol or from polytetramethylene glycol, they are either used as they are and copolycondensed with polyamide blocks containing carboxyl ends or they are aminated in order to convert the polyetherdiamines and then condensed with polyamide blocks containing carboxyl ends. They can also be mixed with polyamide precursors and a chain limiter in order to prepare polymers containing polyamide blocks and polyether blocks having units distributed statistically.

Polymers containing polyamide blocks and polyether blocks are described in U.S. Pat. Nos. 4,331,786; 4,115,475; 4,195,015; 4,839,441; 4,864,014; 4,230,838 and 4,332,920.

The polyether can be, for example, a polypropylene glycol (PPG) or a polytetramethylene glycol (PTMG). The latter is also known as polytetrahydrofuran (PTHF).

When the polyether blocks are in the chain of the polymer containing polyamide blocks and polyether blocks in the form of diols or diamines, they are known for simplicity as PPG blocks or PTMG blocks. This polymer containing polyamide blocks and polyether blocks can comprise a number of types of polyamide blocks and/or a number of types of polyether blocks in the same chain.

The polymer containing polyamide blocks and polyether blocks preferably comprises a single type of polyamide block and a single type of polyether block. Use is advantageously made of polymers containing PA-12 blocks and PTMG blocks and polymers containing PA-6 blocks and PTMG blocks.

It is also possible to use a mixture of these two polymers containing polyamide blocks and polyether blocks.

According to another form of the invention, the polymer containing polyamide blocks and polyether blocks is such that the polyamide is the major constituent by weight, that is to say, the amount of polyamide which is in the form of blocks and that which is optionally distributed statistically in the chain represents 50% by weight or more of the polymer containing polyamide blocks and polyether blocks. Advantageously, the amount of polyamide and the amount of polyether are in the ratio (polyamide/polyether) of 1/1 to 4/1.

Advantageously, (A) is selected from polyamides, copolymers containing polyamide blocks and polyether blocks, polyurethane elastomers or polyetheresters.

Preferably, (A) is a polyamide-6, a polyamide-11, a polyamide-12, a polymer containing PA-6 blocks and PTMG blocks or a polymer containing PA-12 blocks and PTMG blocks.

The polyethylene glycol (or polyoxyethylene, PEG) blocks, HO—[—$C_2H_4$—O—]$_n$—H, of the polymer (B) can have an $\overline{Mn}$ mass between 200 and 6,000.

The polymer (B) can be, for example:

a polyurethane elastomer in which the polyol (1) is polyethylene glycol, a polyetherester in which the polyetherdiol (2) is polyethylene glycol, a polymer containing polyamide blocks and polyether blocks in which the polyether is polyethylene glycol.

Advantageously, the polymer (B) is a polymer containing polyamide blocks and polyethylene glycol blocks. The polyamide blocks are preferably formed from PA-6 or from PA-12.

According to another form of the invention, the polymer (A) can contain, in its chain, PEG blocks in addition to other polyether blocks. If the amount of PEG is sufficient, then the presence of (B) is not necessary.

The belts of the invention are considered to be antistatic when the half-discharge time is less than 3 seconds, advantageously less than 1 second, and preferably between 0.2 and 0.7 seconds.

The half-discharge time is measured as follows:

A sample is placed on an electrically grounded rotating plate. An electrode is positioned out of contact above the sample and is brought to 10 kvolts. This causes ionization of the air and the deposition of charges on the sample.

Another, diametrically opposite electrode measures the surface potential. When the surface potential reaches a steady-state value, this means that charges are flowing out as fast as they are deposited. Charging is halted and then the time taken for the surface potential to fall to half the steady-state value is measured. This time is known as the half-discharge time.

Another test is also used as follows: a belt of the invention or a plate or a bar produced from the material of the belts of the invention is rubbed for a long time with a woollen rag. It does not attract cigarette ash, whereas the polymer (A) alone attracts this ash.

It has been discovered that these tests corresponded to an antistatic behavior, whereas the conventional measurement of the surface resistivity, which falls by a factor of 100 to 1,000 between the polymers (A) and the compositions of the invention comprising the polymers (A) and (B), remains at high values.

The amount of (B) depends on its PEG content and on the antistatic effect desired. Antistatic behavior increases with the amount of (B) and the amount of PEG. The amount of (B) can be from 10 to 40% by weight of (A)+(B).

These mixtures of (A) and (B) can be manufactured according to the usual techniques for mixing thermoplastics in the molten state (twin-screw, Buss, single-screw).

The mixture of (A) and (B) can also comprise antioxidants, agents for combating UV radiation, fillers, and the like.

The advantage of the belts of the invention is their permanent antistatic behavior; there is no migration of (B). If (A) and (B) are polymers containing polyamide blocks and polyether blocks and if the PA blocks of (A) and (B) are of the same type, then the mixture of (A) and (B) is transparent. The belts of the invention do not stain and are not greasy. Another advantage is that the belts of the invention can be washed or wiped without risk of removing the product which contributes the antistatic behavior, unlike ordinary antistatics, which exude, causing a fall in the antistatic behavior.

The belts of the invention are advantageously such that (A) is a polymer containing PA-12 or PA-6 blocks and PTMG blocks and (B) is a polymer containing PA-6 blocks and PEG blocks or containing PA-12 blocks and PEG blocks or their mixture; the belts are preferably such that (A) is a polymer containing PA-6 blocks and PTMG blocks and (B) is a polymer containing PA-6 blocks and PEG blocks or such that (A) is a polymer containing PA-12 blocks and PTMG blocks and (B) is a polymer containing PA-12 blocks and PEG blocks.

The invention also relates to belts comprising a core made of a material (C) between two layers of the antistatic mixture of (A) and (B) described above.

The material (C) can be defined as any material possessing the mechanical properties which are satisfactory for making a belt therefrom, both of the power transmission belt and conveyor belt type. Advantageously, (C) is made of polymer (A).

These belts can be produced by coextrusion. A coextrusion binder or adhesive can optionally be deposited between the core (C) and each antistatic layer. It is also possible to deposit, by extrusion, the two antistatic layers on the core (C) or to laminate all these layers or any combination of these possibilities. The adhesive can be a hot melt.

Mention may be made, as examples of binders, of:

polyethylene, polypropylene, copolymers of ethylene and at least one α-olefin, or mixtures of these polymers, all these polymers being grafted with unsaturated carboxylic anhydrides, such as, for example, maleic anhydride. It is also possible to use mixtures of these grafted polymers and of these nongrafted polymers, copolymers of ethylene with at least one product chosen from (i) unsaturated carboxylic acids, their salts or their esters, (ii) vinyl esters of saturated carboxylic acids, (iii) unsaturated dicarboxylic acids, their salts, their esters, their monoesters or their anhydrides, or (iv) unsaturated epoxides, it being possible for these copolymers to be grafted with unsaturated dicarboxylic anhydrides, such as maleic anhydride, or unsaturated epoxides, such as glycidyl methacrylate, polymers containing polyamide blocks and polyether blocks.

Use is advantageously made of structures requiring neither adhesive nor binder. Mention may be made, by way of examples, of:

(A) and (C) as polyetherester, (A) and (C) as polyamide, (C) as polyamide and (A) as polymer containing polyamide blocks and polyether blocks, (C) and (A) as polymer containing polyamide blocks and polyether blocks, (C) and (A) as polyurethane elastomer,—(C) as polyurethane elastomer and (A) as polymer containing polyamide blocks and polyether blocks or vice versa.

Preference is given to the structure such that:

(C) is a polymer containing PA-12 blocks and PTMG blocks or a polyamide-12, (A) is a polymer containing PA-12 blocks and PTMG blocks, (B) is a polymer containing PA-6 blocks and PEG blocks or a polymer containing PA-12 blocks and PEG blocks or their mixture.

According to another form of the invention, the core (C) is completely covered with the antistatic mixture of (A) and (B), that is to say that, in a cross-section of the belt, the core is completely surrounded by the antistatic mixture of (A) and (B).

DESCRIPTION OF THE PREFERRED EMBODIMENTS

In the following examples:

width of 20 cm and a thickness of 0.9 cm were subsequently prepared in the material of Examples 4 and 7.

The tensile properties of plates were measured on samples of I.F.C. standards (Institut Francais Du Caoutchovc)

The results appear in Table 2, in which "s" means the standard deviation.

TABLE 1

| Examples | 1 | 2 | 3 | 4 | 5 | 6 | 7 |
|---|---|---|---|---|---|---|---|
| Pebax 1 Polymer (A) | 100 | 90 | 80 | 60 | 90 | 80 | 60 |
| Pebax 2 Polymer (B) |  | 10 | 20 | 40 |  |  |  |
| Pebax 3 Polymer (B) |  |  |  |  | 10 | 20 | 40 |
| Σ (parts by weight) | 100 | 100 | 100 | 100 | 100 | 100 | 100 |

TABLE 2

Tensile test on I.F.C. test specimens cut out from films in the direction parallel to extr.

| Examples | Unit | 1 | 2 | 4 | 5 | 6 | 7 |
|---|---|---|---|---|---|---|---|
| TENSILE TEST | | | | | | | |
| Stress at 5% | MPa | 3.95 s = 0.16 | 4.37 s = 0.32 | 4.67 s = 0.16 | 3.81 s = 0.17 | 4.05 s = 0.09 | 3.77 s = 0.34 |
| Stress at 10% | MPa | 5.84 s = 0.03 | 6.07 s = 0.18 | 6.25 s = 0.06 | 5.53 s = 0.06 | 5.79 s = 0.11 | 5.43 s = 0.20 |
| Stress at 15% | MPa | 6.93 s = 0.03 | 7.09 s = 0.16 | 7.23 s = 0.08 | 6.59 s = 0.02 | 6.83 s = 0.12 | 6.43 s = 0.18 |
| Stress at 25% | MPa | 8.04 s = 0.01 | 8.27 s = 0.22 | 8.51 s = 0.09 | 7.75 s = 0.01 | 8.06 s = 0.14 | 7.68 s = 0.14 |
| Stress at 50% | MPa | 9.11 s = 0.05 | 9.35 s = 0.30 | 9.75 s = 0.13 | 8.78 s = 0.04 | 9.21 s = 0.15 | 8.89 s = 0.10 |
| Stress at 100% | MPa | 9.92 s = 0.05 | 10.10 s = 0.34 | 10.55 s = 0.13 | 9.56 s = 0.09 | 10.07 s = 0.18 | 9.69 s = 0.12 |
| Stress at 200% | MPa | 11.94 s = 0.07 | 11.91 s = 0.29 | 12.22 s = 0.20 | 11.37 s = 0.06 | 11.97 s = 0.24 | 11.24 s = 0.09 |
| Stress at 300% | MPa | 14.62 s = 0.13 | 14.37 s = 0.20 | 14.49 s = 0.27 | 13.92 s = 0.03 | 14.37 s = 0.36 | 13.56 s = 0.14 |
| Stress at break | MPa | 46.4 s = 0.5 | 42.7 s = 3.3 | 40.9 s = 1.2 | 37.0 s = 2.4 | 34.7 s = 2.4 | 29.3 s = 2.2 |
| Elongation at break | % | 814 s = 7 | 798 s = 12 | 834 s = 8 | 731 s = 28 | 757 s = 3 | 703 s = 46 |

Pebax 1 denotes: a polymer (A) having PA-12 blocks and PTMG blocks with masses of $\overline{Mn}$ 2000 and 2000 respectively; the MFI (melt flow index) according to ASTM D12 38 is 5 (235° C., 1 kg), the melting temperature 168° C. and the Shore D hardness 40, Pebax 2 denotes: a polymer (B) having PA-12 blocks and PEG blocks with masses of $\overline{Mn}$ 1500 and $\overline{Mn}$ 1500 respectively; the melting temperature is 158° C. and the Shore D hardness 40, Pebax 3 denotes: a polymer (B) having PA-6 blocks and PEG blocks with masses of $\overline{Mn}$ 1500 and $\overline{Mn}$ 1500 respectively; the melting temperature is 204° C. and the Shore D hardness 40.

The compositions which appear in Table 1 were prepared by compounding.

They are put into the form of bars, films and plates in order to measure the properties thereof. Flat belts with a The half-discharge times and the surface resistivity were measured, the samples having been stored for 15 days in an atmosphere at 230° C. with a relative humidity of 50% (50% RH).

The measurements were also repeated two months later, in order to determine the effect of the humidity. These results are given in Table 3.

TABLE 3

| | Half-discharge time (sec) | | Surface resistivity (Ω) ASTM D 257 | |
|---|---|---|---|---|
| Examples | Initial | +2 months | Initial | +2 months |
| 1 | 3.5 | 2.3 | $3.8 \times 10^{14}$ | $9.5 \times 10^{13}$ |
| 2 | 0.5 | 0.6 | $2.7 \times 10^{12}$ | $2.5 \times 10^{12}$ |
| 3 | 0.7 | | $1.4 \times 10^{12}$ | |

TABLE 3-continued

| | Half-discharge time (sec) | | Surface resistivity (Ω) ASTM D 257 | |
|---|---|---|---|---|
| Examples | Initial | +2 months | Initial | +2 months |
| 4 | 0.2 | 0.3 | $6.3 \times 10^{11}$ | $3.8 \times 10^{11}$ |
| 5 | 0.5 | 0.7 | $4.5 \times 10^{12}$ | $9.7 \times 10^{12}$ |
| 6 | 0.5 | 0.5 | $1.3 \times 10^{12}$ | $4.1 \times 10^{12}$ |
| 7 | 0.6 | 0.4 | $2.3 \times 10^{11}$ | |

It has also been observed that Samples 2 to 7, rubbed with a woollen cloth, do not attract cigarette ash whereas Sample 1, under the same conditions, does attract it.

What is claimed is:

1. A belt comprising a thermoplastic polymer (A) and further comprising a sufficient amount of a polymer (B) to render it antistatic, wherein polymer (B) comprises polyethylene glycol blocks and wherein the thermoplastic polymer (A) comprises at least one polymer selected from the group consisting of a polyamide, a mixture comprising at least one polyamide present in the form of a matrix and at least one polyolefin, and a copolymer comprising polyamide blocks and polyether blocks wherein the polyether blocks are selected from the group consisting of polypropylene glycol, polytetramethylene glycol, and mixtures thereof.

2. The belt according to claim 1, wherein the thermoplastic polymer (A) is at least one polymer selected from the group consisting of polyamides and copolymers comprising polyamide blocks and polyether blocks wherein the polyether blocks are selected from the group consisting of polypropylene glycol, polytetramethylene glycol, and mixtures thereof.

3. The belt according to claim 2, wherein the thermoplastic polymer (A) is at least one polymer selected from the group consisting of polyamide-6, polyamide-11, polyamide-12, copolymers comprising polyamide-6 blocks and polytetramethylene glycol blocks, copolymers containing polyamide-11 blocks and polytetramethylene glycol blocks, and copolymers containing PA-12 blocks and polytetramethylene glycol blocks.

4. The belt according to claim 1, wherein the polymer (B) is at least one polymer selected from the group consisting of polyurethane elastomers wherein the polyol of the flexible segments is polyethylene glycol, polyetheresters wherein the polyol of the flexible segments is polyethylene glycol, and copolymers comprising polyamide blocks and polyethylene glycol blocks.

5. The belt according to claim 4, wherein the polymer (B) is selected from copolymers comprising polyamide blocks and polyethylene glycol blocks, the polyamide blocks comprising polyamide-6 or polyamide-12.

6. The belt according to claim 1, wherein polymer (B) represents 10 to 40% by weight of (A)+(B).

7. The belt according to claim 1, further comprising a core comprising a material (C), wherein the core is interposed between two antistatic layers, each layer comprising an antistatic mixture of thermoplastic polymer (A) and polymer (B).

8. The belt according to claim 1, used as a power transmission belt or as a conveyor belt.

9. The belt according to claim 7, wherein the material (C) comprises the thermoplastic polymer (A).

10. A belt comprising a thermoplastic polymer (A) and further comprising a sufficient amount of a polymer (B) to render it antistatic, wherein polymer (B) comprises polyethylene glycol blocks and wherein the thermoplastic polymer (A) comprises at least one copolymer comprising polyamide blocks and polyether blocks wherein the polyether blocks are selected from the group consisting of polypropylene glycol, polytetramethylene glycol, and mixtures thereof.

11. The belt according to claim 10, wherein the thermoplastic polymer (A) comprises at least one copolymer comprising polyamide blocks and polyether blocks and further wherein the polyether blocks comprise polytetramethylene glycol and the polyamide blocks comprise polyamide-6 or polyamide-12.

12. The belt according to claim 11, wherein the polymer (B) is selected from copolymers comprising polyamide blocks and polyethylene glycol blocks, the polyamide blocks comprising polyamide-6 or polyamide-12.

13. The belt according to claim 12, wherein the polymer (B) represents 10 to 40% by weight of (A)+(B).

14. The belt according to claim 12, further comprising a core comprising a material (C), wherein the core is interposed between two antistatic layers, each layer comprising an antistatic mixture of thermoplastic polymer (A) and polymer (B).

15. The belt according to claim 14, wherein the material (C) comprises the thermoplastic polymer (A).

16. The belt according to claim 12, used as a power transmission belt or as a conveyor belt.

* * * * *